(12) United States Patent
Sin

(10) Patent No.: US 8,209,847 B2
(45) Date of Patent: Jul. 3, 2012

(54) METHOD OF FABRICATING A MAGNETIC HEAD

(75) Inventor: Kyusik Sin, Seongnam-si (KR)

(73) Assignee: Seagate Technology International, Cupertino, CA (US)

( * ) Notice: Subject to any disclaimer, the term of this patent is extended or adjusted under 35 U.S.C. 154(b) by 1115 days.

(21) Appl. No.: 12/061,687

(22) Filed: Apr. 3, 2008

(65) Prior Publication Data

US 2009/0067100 A1    Mar. 12, 2009

(30) Foreign Application Priority Data

Sep. 12, 2007    (KR) .................. 10-2007-0092652

(51) Int. Cl.
*G11B 5/127* (2006.01)
*H04R 31/00* (2006.01)

(52) U.S. Cl. ............... 29/603.14; 29/603.12; 29/603.13; 29/603.15; 29/603.16; 29/603.18; 216/62; 216/65; 216/66; 360/121; 360/122; 360/317

(58) Field of Classification Search ............... 29/603.07, 29/603.12–603.16, 603.18; 216/62, 65, 66; 360/121, 122, 317; 451/5, 41
See application file for complete search history.

(56) References Cited

U.S. PATENT DOCUMENTS

| | | | | |
|---|---|---|---|---|
| 5,648,884 | A * | 7/1997 | Lazzari ...................... | 360/318.1 |
| 6,452,759 | B2 * | 9/2002 | Urai .............................. | 360/318 |
| 6,731,459 | B2 * | 5/2004 | Kamijima ............... | 360/125.43 |
| 7,284,316 | B1 * | 10/2007 | Huai et al. ................. | 29/603.16 |
| 7,360,302 | B2 * | 4/2008 | Sato et al. ................. | 29/603.27 |
| 7,687,284 | B2 * | 3/2010 | Naito et al. ...................... | 438/3 |

* cited by examiner

*Primary Examiner* — Paul D Kim
(74) *Attorney, Agent, or Firm* — Hall Estill Attorneys at Law

(57) ABSTRACT

A method of fabricating a magnetic head is provided. The method of fabricating the magnetic head includes forming a writing head on a writing head area, forming an insulating layer having an inclined surface, forming a reading head on the inclined surface of the insulating layer, and forming an air bearing surface by polishing the surfaces of the writing head. Forming the reading head includes forming a first shield layer, a reading sensor, and a second shield layer.

10 Claims, 5 Drawing Sheets

MOVEMENT DIRECTION OF MEDIUM

MOVEMENT DIRECTION OF MEDIUM

METHOD OF FABRICATING A MAGNETIC HEAD

CROSS-REFERENCE TO RELATED PATENT APPLICATIONS

This application claims priority to Korean Patent Application No. 10-2007-0092652, filed on Sep. 12, 2007, and all the benefits accruing therefrom under 35 U.S.C. §119, the contents of which are incorporated herein by reference in their entirety.

BACKGROUND OF THE INVENTION

1. Field of the Invention

The present invention relates to a magnetic head and a method of fabricating the magnetic head, and more particularly, to a reading head in a perpendicular magnetic recording head and a method of fabricating the reading head.

2. Description of the Related Art

Magnetic recording can be classified as longitudinal magnetic recording and perpendicular magnetic recording according to a recording method. The longitudinal magnetic recording method records information using a characteristic that a magnetization direction of a magnetic layer is arranged in parallel with a surface of the magnetic layer, and the perpendicular magnetic recording method records information using a characteristic that the magnetization direction of the magnetic layer is arranged perpendicular to the surface of the magnetic layer. In view of a recording density, the perpendicular magnetic recording method can record more information than the longitudinal magnetic recording method.

A magnetic head, for performing the perpendicular magnetic recording, includes a writing head that writes information onto a perpendicular magnetic recording medium and a reading head that reads the information recorded on the recording medium.

The writing head includes a main pole, a return pole, and a magnetic coil. The main pole and the return pole form a magnetic path of a recording magnetic field that is generated by the magnetic coil, and are formed of a magnetic material such as NiFe. Also, a component ratio of each component can be adjusted to differentiate saturation flux densities (Bs) of the main pole and the return pole. The magnetic coil generates a recording magnetic field for recording the information on the recording medium. A surface of the writing head, which faces a recording layer of the recording medium, is defined as an air-bearing surface.

The reading head includes a reading sensor that is protected from an external magnetic field by a shield layer, and the reading sensor can be a giant magneto-resistance (GMR) device or a tunneling magneto-resistance (TMR) device.

Magnetic writing heads can be classified as heads including a spiral type coil structure, in which the magnetic coil surrounds the area where the main pole and the return pole contact each other from upper and lower directions, heads including a dual pancake type coil structure, in which the magnetic coil is formed to have an upper portion and a lower portion between the main pole and the shield layer, and heads including a planar coil structure, in which the magnetic coil is formed as a plane in parallel with the recording surface. The heads having the planar coil structure have a larger recording field and a higher resolution than those of the heads having other types of coil structures, and thus, can be suitable for a high coercivity medium that is required by high density recording media.

The writing head having the planar coil structure uses a planar process involving the forming of a predetermined material layer on a substrate corresponding to the planar recording medium and patterning of the material layer, and thus, the reading head that is integrally formed with the writing head should have a structure that can be planar-processed.

Due to the processing limitations of a conventional reading head formed using the planar process, the reading sensor cannot be fabricated to have a structure that directly detects the magnetism from the recording medium because the layers are stacked onto the substrate in the planar process, and thus, the reading sensor is arranged in parallel with the substrate inevitably, and the reading sensor cannot be exposed to the air-bearing surface. Due to this problem, an additional magnetic flux guide is conventionally used to transfer the flux to the air-bearing surface to the reading sensor. According to this remote sensing structure, the flux cannot be sufficiently transferred to the reading sensor because of a magnetic loss caused by the magnetic flux guide. Therefore, according to the conventional reading head, a reproducing sensitivity may be degraded by using the magnetic flux guide.

SUMMARY OF THE INVENTION

The present invention provides a magnetic head having a high reproducing sensitivity.

The present invention also provides a magnetic head having a high reproducing sensitivity even when a planar process, for performing a perpendicular magnetic recording, is performed.

The present invention also provides a method of fabricating a magnetic head having a high reproducing sensitivity.

According to an aspect of the present invention, there is provided a magnetic head including: a reading sensor detecting magnetism from a magnetic recording medium; a first shield layer and a second shield layer disposed on both sides of the reading sensor; an air bearing surface (ABS) facing the magnetic recording medium, wherein the first shield layer, the second shield layer, and the reading sensor are formed to have an inclined angle with respect to the ABS.

According to another aspect of the present invention, there is provided a magnetic head including: a writing head recording information on a recording layer of a magnetic recording medium; and a reading head reproducing the recorded information, wherein the reading head forms an inclined angle with an air bearing surface (ABS).

The writing head may include a magnetic coil that is formed in parallel with a substrate. The inclined angle may be an acute angle or an obtuse angle. The reading sensor may be one selected from the group consisting of a giant magneto-resistance (GMR) device, a tunneling magneto-resistance (TMR) device, and a current perpendicular to the planes (CPP) MR device.

According to another aspect of the present invention, there is provided a method of fabricating a magnetic head, which is formed with a writing head and a reading head respectively on a writing head area and a reading head area adjacent to the writing head area, on a substrate, the method including: forming a writing head on the writing head area; forming an insulating layer having an inclined surface with respect to the substrate on the reading head area; forming a reading head on the inclined surface of the insulating layer; and forming an air bearing surface (ABS) by polishing surfaces of the writing head and the reading head.

The method may further include: forming an insulating layer that covers at least the reading head, after forming the reading head.

The inclined angle of the inclined surface may be an acute angle or an obtuse angle.

The forming of the reading head may include: sequentially forming a first shield layer, a reading sensor, and a second shield layer. The first and second shield layers may be formed of a magnetic material. The reading sensor may be formed of a tunneling magneto-resistance (TMR) device. The reading sensor may be formed using an anisotropic etching method. The insulating layer may be formed of $Al_2O_3$ or $SiO_2$.

The forming of the ABS may be performed using a chemical mechanical polishing (CMP) method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
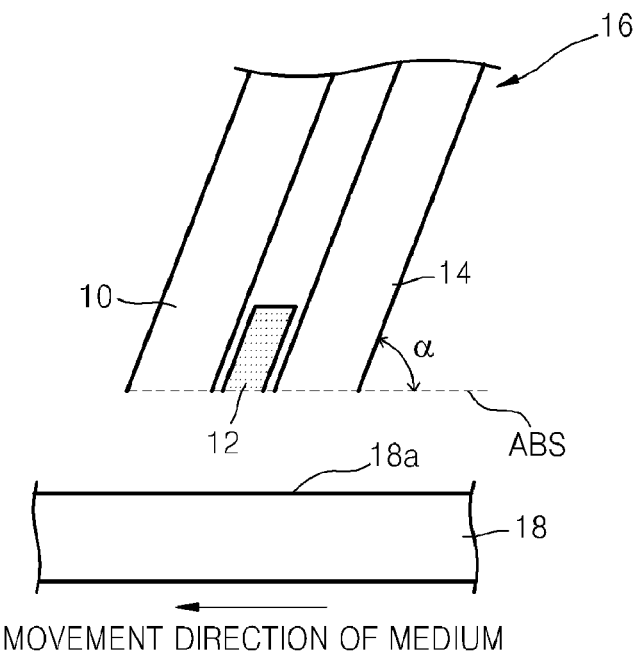
FIGS. 1A and 1B are cross-sectional views showing a structure of a reading head in a magnetic head, according to embodiments of the present invention.

The invention is described more fully hereinafter with reference to the accompanying drawings, in which embodiments of the invention are shown. This should not be construed as limiting the claims to the embodiments shown. Rather, these embodiments are provided to convey the scope of the invention to one skilled in the art. In the drawings, the size and relative sizes of elements and regions may be exaggerated for clarity.

It will be understood that when an element or layer is referred to as being "on", "interposed", "disposed", or "between" another element or layer, it can be directly on, interposed, disposed, or between the other element or layer or intervening elements or layers can be present.

The terms "first," "second," and the like, "primary," "secondary," and the like, as used herein do not denote any order, quantity, or importance, but rather are used to distinguish one element, region, component, layer, or section from another. The terms "front", "back", "bottom", and/or "top" are used herein, unless otherwise noted, merely for convenience of description, and are not limited to any one position or spatial orientation.

The terms "a" and "an" do not denote a limitation of quantity, but rather denote the presence of at least one of the referenced item. The suffix "(s)" as used herein is intended to include both the singular and the plural of the term that it modifies, thereby comprising one or more of that term (e.g., the layer(s) includes one or more layers).

Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Unless defined otherwise, technical and scientific terms used herein have the same meaning as is commonly understood by one of skill in the art to which this invention belongs.

Figure 1B:
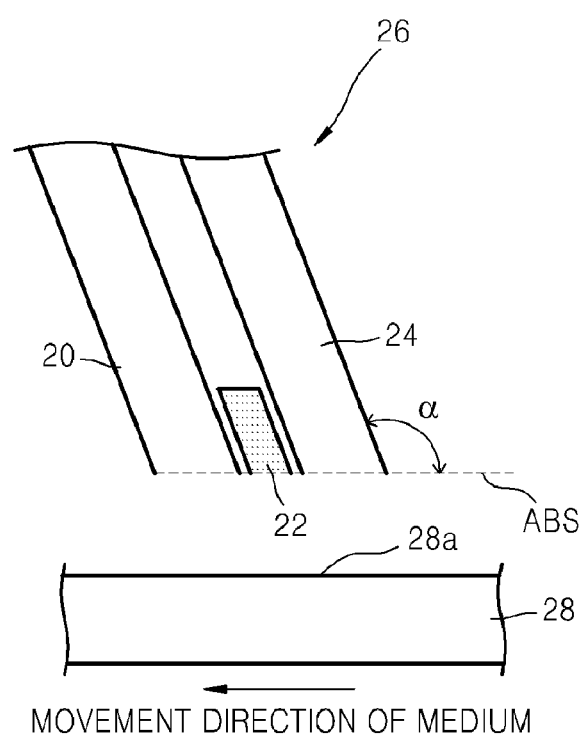

FIGS. 1A and 1B are cross-sectional views showing a structure of a reading head 16 in a magnetic writing head, according to embodiments of the present invention.

Referring to FIGS. 1A and 1B, the reading head 16 includes a first shield layer 10, a second shield layer 14, and a reading sensor 12 disposed between the first and second shield layers 10 and 14. The first and second shield layers 10 and 14, and the reading sensor 12 are in parallel with each other, and are inclined with respect to a recording surface 18a of a recording medium 18. The cross sections of the first and second shield layers 10 and 14, and the reading sensor 12 that are inclined with respect to the recording surface 18a form a common plane, and the common plane is an air bearing surface (ABS) that faces the recording surface 18a in parallel. The ABS generates a force that makes the magnetic head float above the recording surface 18a of the recording medium 18 that rotates at high speed, such that there is a very narrow air gap between the ABS and the recording surface 18a of the recording medium 18.

The reading head 16 is an electromagnetic signal transducer reading information from the recording medium 18 in a magnetic recording apparatus such as a hard disc drive (HDD). The reading head 16, according to the present embodiment, has a structure that is inclined with respect to the ABS. The inclined angle α of the reading head 16 with respect to the ABS can be an acute angle or an obtuse angle. That is, as shown in FIG. 1A, the reading head 16 can be inclined with an acute angle (<90°) with the ABS, or as shown in FIG. 1B, the reading head 16 can be inclined with an obtuse angle (90°<α<180°) with the ABS. Here, the inclined angle (α) is the angle of the magnetic head with respect to the recording medium 18 in a moving direction. For example, in a case where the recording medium 18 moves from right to left and the reading head 16 relatively moves from left to right with respect to the recording medium 18, the reading head 16 of FIG. 1A is inclined toward the moving direction of the reading head 16, and the reading head 16 of FIG. 1B is inclined toward the opposite direction of the moving direction of the reading head 16. That is, according to the present invention, the reading head 16 is not formed perpendicularly to the recording medium 18, unlike the conventional reading head, however the reading head 16 is inclined with respect to the ABS. Also, since the reading head 16 can be inclined to form the acute angle or the obtuse angle with respect to the ABS, the inclining direction of the reading head 16 does not limit the technical scope of the present invention.

The first and second shield layers 10 and 14 are formed of a magnetic material such as an alloy of NiFe, and provide paths of electric signals such as electric currents to the reading sensor 12. Moreover, the first and second shield layers 10 and 14 are units to shield from the external magnetic field, and thus, protect the reading sensor 12 so that the reading sensor 12 does not sense the external magnetic field. Therefore, the reading sensor 12 is protected from the external magnetic field, and only senses the magnetic field from the recording medium 18, that is, recorded magnetic information. The reading sensor 12 can be a TMR device, a GMR device, or a current perpendicular to the planes (CPP) MR device, which are conventionally used.

Figure 2:
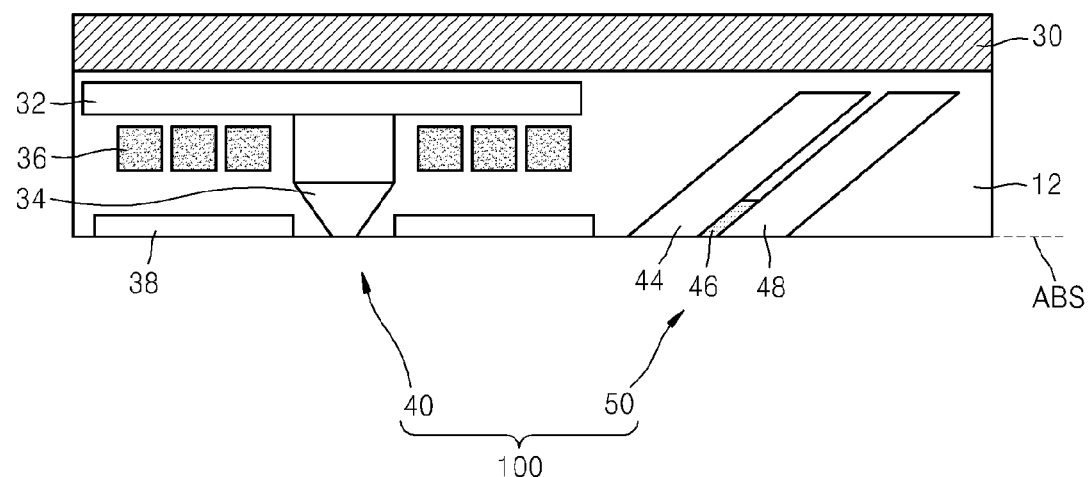
FIG. 2 is a cross-sectional view showing a structure of a magnetic head according to another embodiment of the present invention.

FIG. 2 is a cross-sectional view showing a schematic structure of a magnetic writing head 100, according to another embodiment of the present invention.

Referring to FIG. 2, the magnetic writing head 100 has a structure, in which a writing head 40, recording the information on a magnetic recording medium, and a reading head 50, reproducing the recorded information, are integrated on a substrate 30. The writing head 40 includes a planar magnetic coil 36, which is wound in parallel with the substrate 30, based on a return pole 32, a return pole formed on upper and lower portions of the planar magnetic coil 36, and a shield layer 38. The planar magnetic coil 36 is formed to be parallel with the substrate 30, and thus, the return pole 32 is also formed to be parallel with the substrate 30.

The reading head 50 is formed on a side of the substrate 30 to be adjacent to the writing head 40. The reading head 50 includes a first shield layer 44 and a second shield layer 48 that are parallel with each other with a predetermined distance between the shield layer 44 and the second shield layer 48, and a reading sensor 46 between the first and second shield layers 44 and 48. The reading head 50 is inclined with respect to the ABS to form the acute angle or the obtuse angle as described above, and a side surface of the reading sensor 46, that is, a magnetic detection surface, is part of the ABS. Therefore, the magnetic writing head 100 of the present invention can have the structure in which magnetic bit information from the magnetic recording medium directly reach the reading sensor 46, and thus, a high reproducing sensitivity can be obtained.

Since the magnetic writing head 100 having the planar magnetic coil 36 includes the structure in that the substrate 30 and the ABS are parallel with each other, not only the writing head 40, however the reading head 50 also, should be fabricated by a planar process including a series of processes forming layers sequentially and patterning the layers. According to a method of fabricating the magnetic writing head 100 of the present invention, the reading head 50 having a high quality can be fabricated by the planar process because of the structural characteristic of the reading head 50 of the present invention. The reading head 50 is formed on a side portion of the writing head 40 that is formed on the substrate 30, in more detail, the reading head 50 is formed on an inclined surface of an insulating layer, which is separately formed, after fabricating the writing head 40.

The reading head 50 has a high reproducing sensitivity by the fabrication method of the present invention, and such high reproducing sensitivity can be ensured by the reading sensor 46 that is located at the ABS or adjacent to the ABS.

That is, when the reading head 50 is formed as a structure that is inclined with respect to the substrate 30, the reading sensor 46 of the reading head 50 can directly receive vertical components of the magnetic flux generated from the recording layer, that is, the reading sensor 46 is located on the ABS to directly detect the magnetic flux from the recording layer. The reading head 50 according to the present invention can have a sensitivity that is improved higher than that of the conventional reading head that is fabricated by the planar process. Because the reading sensor 46 of the present invention directly detects the magnetism, while the conventional reading head is disposed in parallel with the substrate and the reading sensor indirectly detects the magnetism using the flux guide as an additional structure.

Hereinafter, a method of fabricating the magnetic head according to an embodiment of the present invention will be described.

FIGS. 3A through 3G are diagrams illustrating the method of fabricating a magnetic writing head 90, according to an embodiment of the present invention.

Figure 3A:
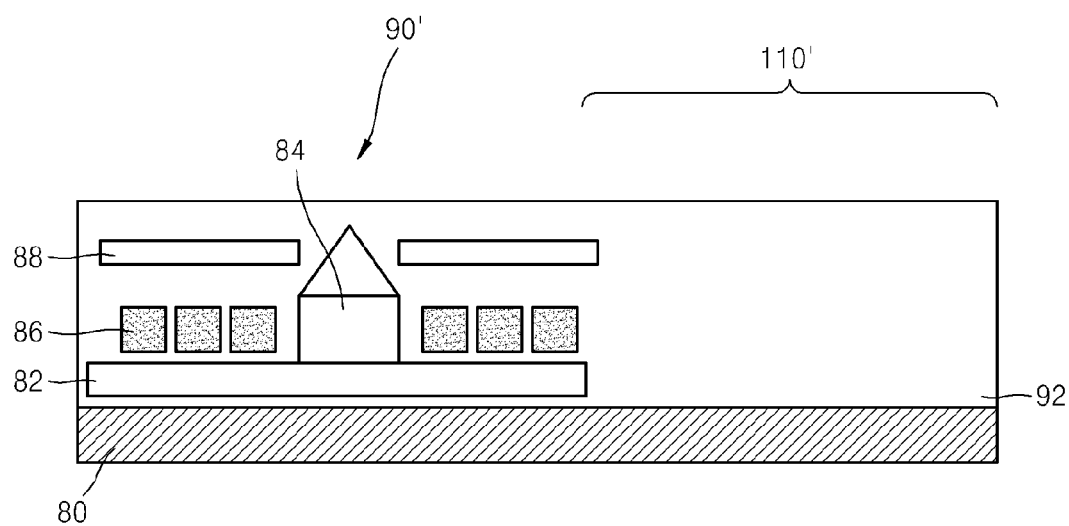
FIGS. 3A through 3G are diagrams illustrating a method of fabricating a magnetic head, according to an embodiment of the present invention.

Referring to FIG. 3A, the magnetic writing head 90 is formed on a writing head area 90' that is located on a side (left portion on the substrate in the present embodiment) using a conventional method. The magnetic writing head 90 includes a return pole 82 that is formed in parallel with a substrate 80, a main pole 84 formed on a center portion of the return pole 82, so that the main pole 84 is perpendicular to the substrate 80, a magnetic coil 86 surrounding the main pole 88 in parallel with the substrate 80, and a shield 88 above the magnetic coil 86 in parallel with the substrate 80. The writing head 90 shown in FIG. 3A is in a half-processed status, and then, the main pole 84 is completely covered by an insulating layer 92 that is formed of $Al_2O_3$ or $SiO_2$. The insulating layer 92 also covers a reading head area 110'.

Figure 3B:
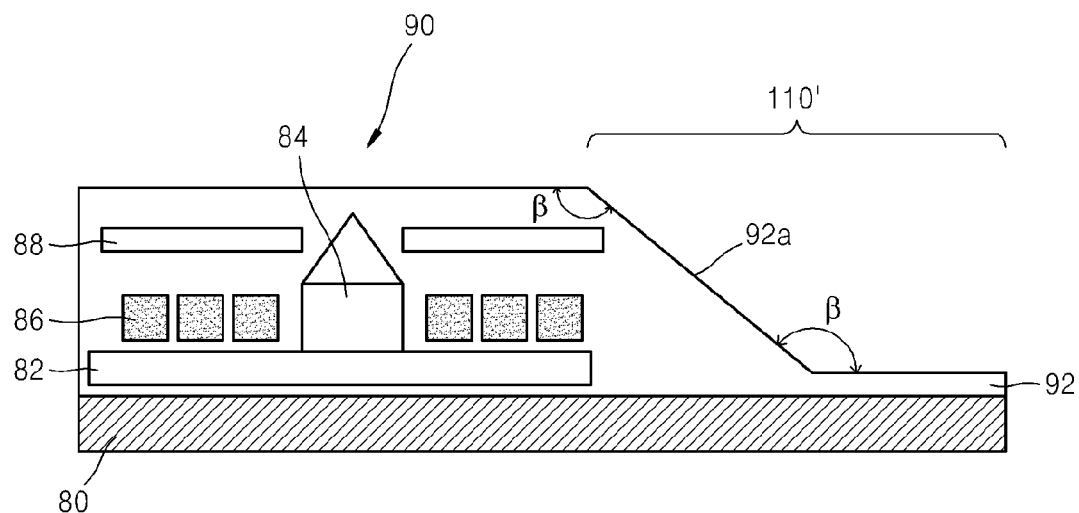

Referring to FIG. 3B, the insulating layer 92, located on the reading head area 110', is etched to have an incline surface 92a having an inclination angle β and on which a reading head structure will be stacked. The inclination angle β can be formed as an acute angle or an obtuse angle with respect to the substrate 80 or a surface of the insulating layer 92. The inclined surface 92a of the reading head area 110' can be formed using an anisotropic etching method such as an ion beam etching method or a reactive ion etching method using a photoresist (PR) or a hard mask.

Figure 3C:
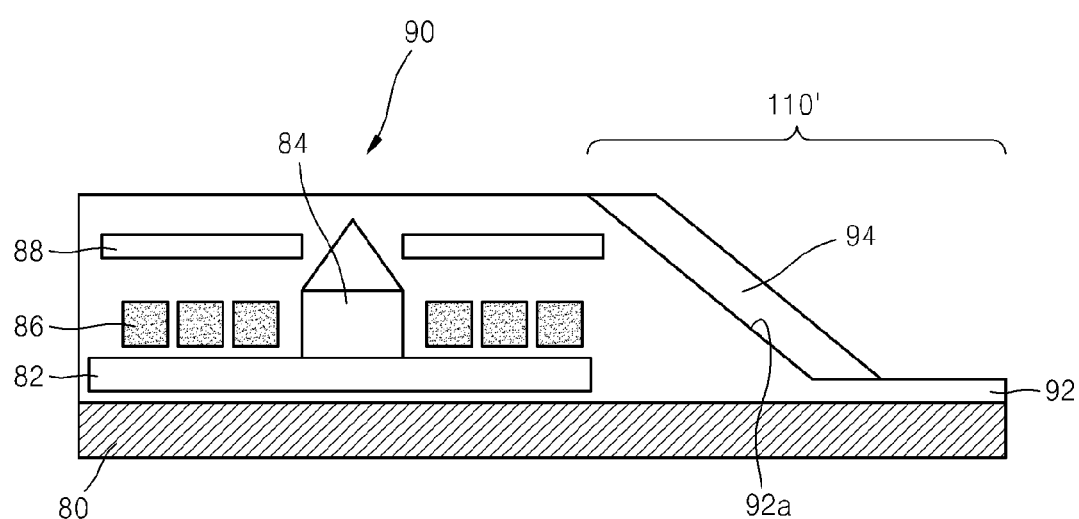

Referring to FIG. 3C, a first shield layer 94 is formed on the inclined surface 92a of the reading head area 110'. The first shield layer 94 is formed of a magnetic material, and can be obtained by depositing the magnetic material using a sputtering method and patterning the magnetic material using a dry anisotropic etching or a wet anisotropic etching method.

Figure 3D:
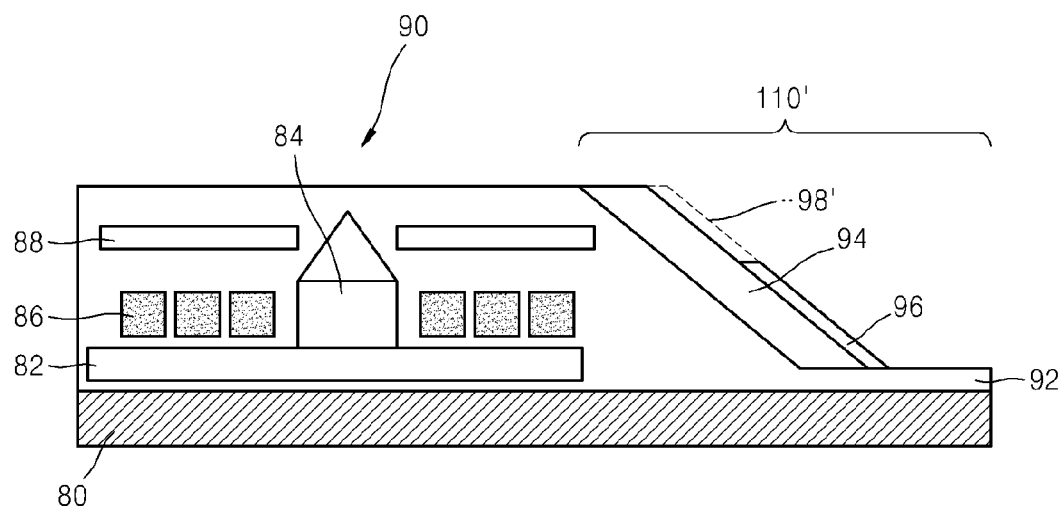

Referring to FIG. 3D, after patterning the first shield layer 94, a sensor material layer 98a, for forming a reading sensor such as the GMR, the TMR, or the CPP sensor, is deposited.

Figure 3E:
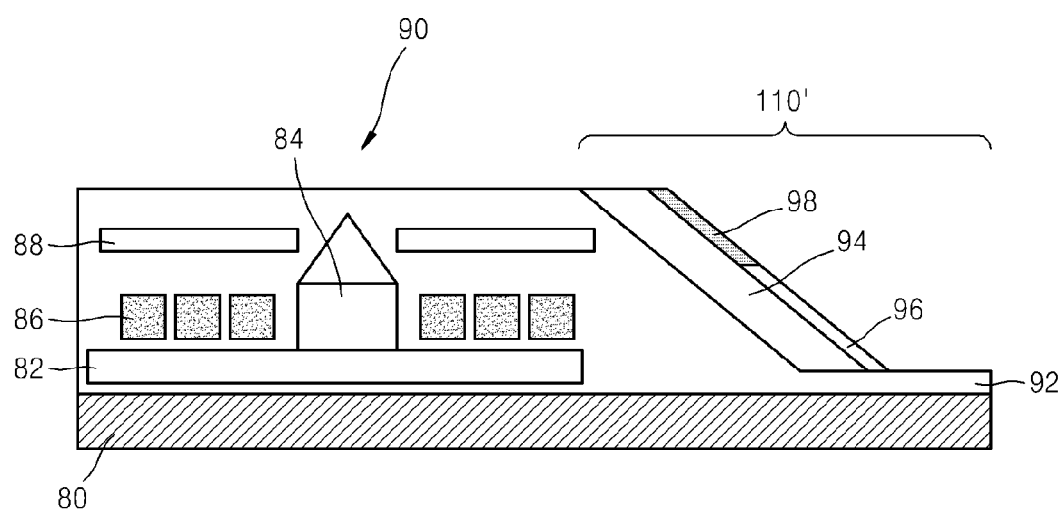

Referring to FIG. 3E, the deposited sensor material layer 98a is patterned using a photolithography process to form the reading sensor 98 having a track width and a stripe height corresponding to those of tracks in the recording medium. At this time, a hard bias layer (not shown) that is applied in a general reading head is also formed. The hard bias layer is formed of an alloy such as CoPt or CoCrPt, and is patterned using the photolithography process. After that, a gap layer 96 having a height corresponding to that of the reading head 98 is formed on a side portion of the first shield layer 94, on which the reading sensor 98 is not formed. The gap layer 96 is formed by depositing an insulating material such as $Al_2O_3$ or $SiO_2$ and by patterning the insulating material using an ion beam method or a photolithography method.

Figure 3F:
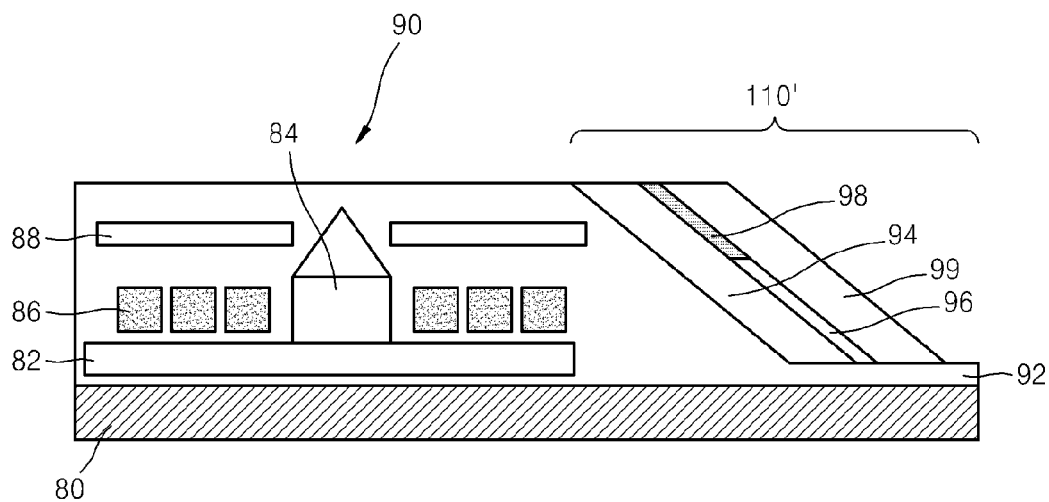

Referring to FIG. 3F, a second shield layer 99 is formed on the reading sensor 98 and the gap layer 96 to form a basic structure of a reading head 110. The second shield layer 99 is formed of a magnetic material such as an NiFe alloy, like the first shield layer 94. The magnetic material can be deposited using a sputtering method. The reading head 110 includes the first and second shield layers 94 and 99, and the reading sensor 98 between the first and second shield layers 94 and 99, and if necessary, can further include an additional insulating layer protecting the reading sensor 98.

Figure 3G:
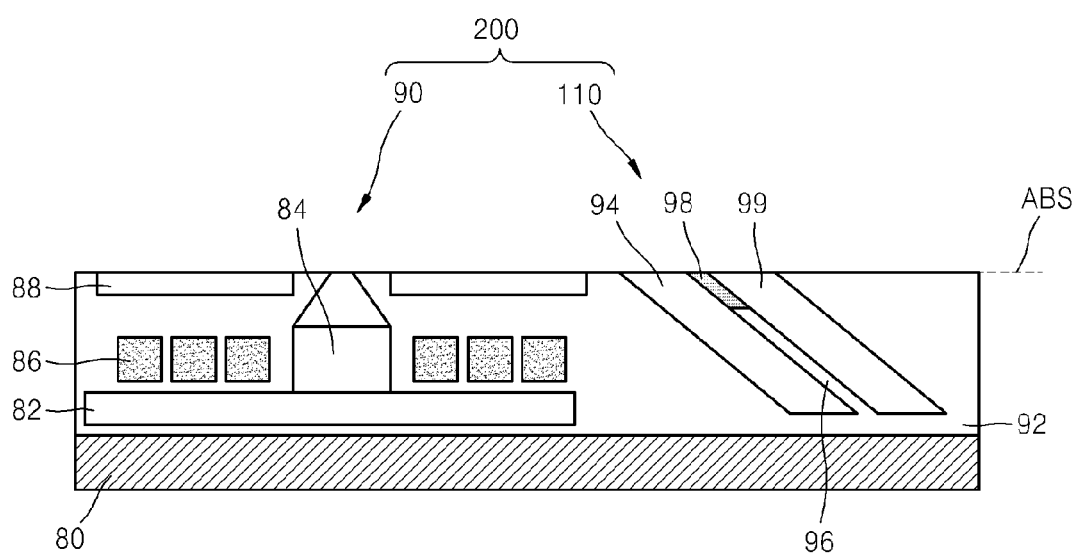

Referring to FIG. 3G, $Al_2O_3$ or $SiO_2$ is deposited on the reading head area 110' to cover the second shield layer 98 and the portions under the second shield layer 98 using the insulating layer 92, and to obtain the reading head 110 that is protected by the insulating layer 92. In addition, the insulating layer 92 is polished using a flattening process such as a chemical mechanical polishing (CMP) process to obtain the ABS. The flattening process is a completing process of the fabrication of the writing head, and includes the polishing process of the insulating layer 92 that may include the insulating layer 92 covering the writing head 90. Through the process of forming the ABS using the flattening process, the surface of the insulating layer 92 is polished, and thus, the main pole 84 of the writing head 90 is also polished and flattened. In addition, cross sections of the first and second shield layers 92 and 99, and the reading sensor 98 are polished to coincide with the ABS. Through the above processes, the magnetic head 200 of the present invention can be obtained.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of fabricating a magnetic head, which is formed with a writing head and a reading head respectively on a writing head area and a reading head area adjacent to the writing head area, on a substrate, the method comprising:
   forming a writing head on the writing head area;
   forming an insulating layer having an inclined surface with respect to the substrate on the reading head area;
   forming a reading head on the inclined surface of the insulating layer; and
   forming an air bearing surface (ABS) by polishing surfaces of the writing head and the reading head,
   wherein the forming of the reading head comprises forming a first shield layer, a reading sensor, and a second shield layer, and
   wherein the first shield layer, the reading sensor and the second shield layer have an inclined angle with respect to the ABS.

2. The method of claim 1, further comprising:
   forming an insulating layer that covers at least the reading head, after forming the reading head.

3. The method of claim 1, wherein the inclined angle of the inclined surface is an acute angle.

4. The method of claim 1, wherein the inclined angle of the inclined surface is an obtuse angle.

5. The method of claim 1, wherein the forming of the first shield layer, the reading sensor, and the second shield layer comprises:
   sequentially forming the first shield layer, the reading sensor, and the second shield layer.

6. The method of claim 5, wherein the first and second shield layers are formed of a magnetic material.

7. The method of claim 5, wherein the reading sensor is formed of a tunneling magneto-resistance (TMR) device.

8. The method of claim 1, wherein the reading sensor is formed using an anisotropic etching method.

9. The method of claim 1, wherein the insulating layer is formed of $Al_2O_3$ or $SiO_2$.

10. The method of claim 1, wherein the forming of the ABS is performed using a chemical mechanical polishing (CMP) method.

* * * * *